April 1, 1958 — I. H. STEWART — 2,828,754
DENTAL FLOSS HOLDER
Filed Nov. 23, 1956

INVENTOR
Irwin H. Stewart,
BY Nathan A. Conn
ATTORNEY

2,828,754

Patented Apr. 1, 1958

2,828,754

DENTAL FLOSS HOLDER

Irwin H. Stewart, Duluth, Minn.

Application November 23, 1956, Serial No. 623,991

9 Claims. (Cl. 132—91)

This invention relates to dental floss holders of a type used for cleaning teeth for prophylactic purposes.

One object of the invention is to provide a dental floss holder of the character indicated which may be readily grasped by the person using the same and conveniently inserted into the mouth so as to readily reach both the upper and lower teeth at either side of the mouth.

Another object is to provide a dental floss holder which is so constructed that the floss may be tensioned with the same hand grasping the holder while the teeth are being cleaned.

A further object is to provide a holder of this character to which the length of floss may be inserted and removed with greatest facility.

A still further object is to provide a dental floss holder which is easy to manufacture at a low cost.

The various further objects and advantages of my invention will appear from the following detailed description, and the features of novelty will be particularly pointed out in the claims.

In the accompanying drawing illustrating preferred embodiments of my invention:

Figure 1:
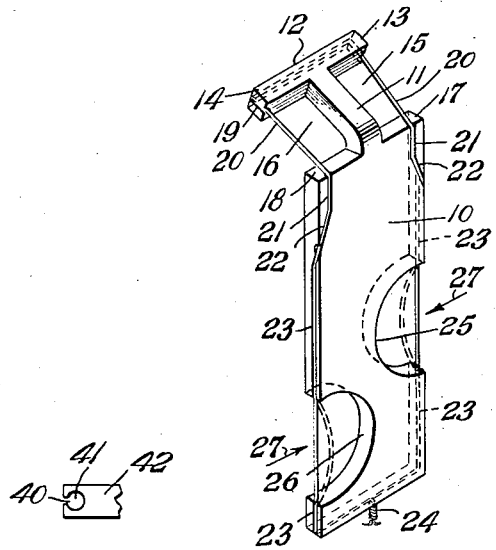
Figure 1 is a perspective view of one form of my improved dental floss holder with the floss shown as trained about its perimeter in proper position for use.
Figure 3:
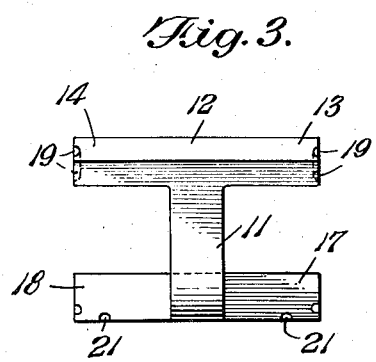
Figure 3 is an enlarged plan view of the top of the holder.
Figures 2, 6:
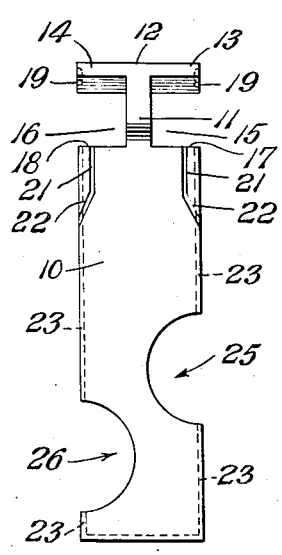
Figure 2 is an elevation of the holder with the dental floss omitted.
Figure 6 is a fragmental detail of a modified form of retaining groove for receiving the dental floss therein.

Referring in detail to Figures 1, 2 and 3 of the drawing, the handle portion 10 of the holder is formed with a neck portion 11 extending at an angle therefrom terminating in a head 12 formed with portions 13, 14 extending at opposite sides of the neck portion so as to leave spaces 15, 16 between said portions of the head and adjacent shoulders 17, 18 of the handle portion 10. The extremities of portions 13, 14 are formed with grooves 19 adapted to retain therein a strand of dental floss 20. Grooves 21 are formed at the back of the handle 10 adjacent to the shoulder portions 17, 18 in which grooves the strand of floss 20 is trained. Grooves 21 diverge at 22 to merge with the grooves 23 formed in the side edges of handle 10. A strand of dental floss is trained about the holder so as to be retained in grooves 19, 21, 22, 23, and the ends of the strand may be joined as by tying the same together at 24 to complete a loop around the periphery of the holder.

For the purpose of tensioning the dental floss while it is being used in cleaning the teth, cutout portions 25, 26 are formed in the lateral edges of handle 10 of the holder, these cutouts being so shaped as to enable the fingers of the same hand grasping the handle to apply pressure in the directions indicated by the arrows 27. The cutout portions 25, 26 are preferably staggered so as to better accommodate the fingers of the hand grasping the handle, and further so as not to unduly weaken the handle of the holder.

The portions of the strand of dental floss spanning the spaces 15 and 16 may be used for working on the upper and lower teeth without changing the position of the holder. By reason of the inclination of the neck 11 with respect to the handle 10, the insertion of the holder into the mouth so as to reach the back teeth is facilitated. By reversing the position of head 12 from the left to the right it is possible to use the holder on the teeth at the right side of the mouth with equal facility.

My improved holder is preferably made of a plastic material, such as a thermoplastic or thermosetting material, which may be readily molded in the shape and with the grooves as illustrated.

Figures 4, 5:
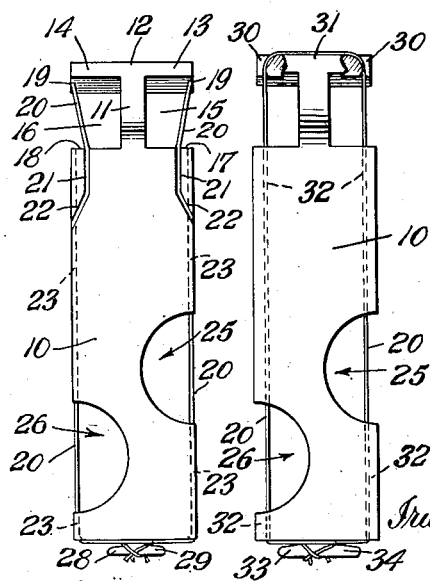
Figure 4 is an elevational view showing a modified form of securing means for securing the floss on the holder.
Figure 5 illustrates a further modified form showing another construction and arrangement of retaining groove for holding the dental floss about the perimeter of the holder.

Figure 4 illustrates a modified form of the invention, in which means is provided whereby the ends of the floss strand may be joined without requiring tying. This means comprises projections or horns 28, 29, formed at the bottom of the holder 10. The end of the strand of floss may be wound about these horns as illustrated and retained thereabout without requiring tying as in the first form described. The ends of the strand tend to wedge in the slot formed between these horns and the base of the holder so as to be securely held in position against disengagement.

Figure 5 illustrates a modified form of the invention in which the grooves 21 formed at the back of the handle 10 as shown in Figure 1 are dispensed with. Instead, grooves 30 of increased depth compared with the grooves in the first form described are formed in head 31, and grooves 32 in the edges of handle 10 of the holder are also of increased depth. The strand of dental floss 20 is trained about the periphery of the holder in the same manner as previously described, the ends of the strand being wound around the horns or projections 33, 34 to retain the same without requiring tying as described in connection with the form shown in Figure 4.

Figure 6 illustrates an alternate form of groove which may be more effective in retaining the dental floss in position. This groove has the entering mouth portion 40 thereof made of reduced dimension compared to the cross section 41 of the interior groove. This type of groove is illustrated in Figure 6 as formed in the head, but it may also be used for the groove in the edges of the handle portion.

Although I have shown several embodiments of the invention I wish it understood that various changes may be made in the form and proportions of the holder without departing from the spirit of my invention and the scope of the appended claims.

What I claim and desire to secure by Letters Patent is:

1. A dental floss holder comprising a head portion, a neck portion extending therefrom, and a handle portion extending at an angle from the neck portion, said handle portion being formed with shoulders extending on opposite sides of the base of the neck portion, there being grooves formed in the lateral extremities of the head portion and at adjacent extremities of the shoulder portions, said grooves also extending about the side edge portions of said handle portion for guiding a strand of dental floss about the perimeter of said handle, said grooves being of a shape adapted to retain said strand of dental floss guided therein, the length of said neck portion being sufficient to leave spaces between the head portion and said shoulders between which said dental floss may be stretched for use in cleaning the teeth.

2. A dental floss holder as defined in claim 1, wherein said handle portion is formed with cutout portions at its lateral edges across which cutout portions the floss may be pressed to apply tension to the floss while manipulating the holder during teeth cleaning operation.

3. A dental floss holder as defined in claim 2 wherein said cutout portions are shaped so as to accommodate the entry therein of fingers grasping the handle.

4. A dental floss holder as defined in claim 3, wherein said cutouts are disposed in staggered position at the opposite edges of the handle.

5. A dental floss holder as defined in claim 1, wherein said grooves in said shoulders are formed at the back of said handle portion and merging with grooves formed in the side edges of said handle portion.

6. A dental floss holder comprising a head portion, a neck portion extending therefrom, and a handle portion extending from the neck portion, said handle portion being formed with shoulders extending on opposite sides of the base of the neck portion, there being grooves formed in the lateral extremities of the head portion and at adjacent extremities of the shoulder portions, and extending along the lateral edges of said handle portion, said grooves being of a shape adapted to retain a strand of dental floss guided therein, the length of said neck portion being sufficient to leave spaces between the head portion and said shoulders between which said dental floss may be stretched for use in cleaning the teeth, and means formed on an edge portion of the handle about which the extremities of a length of dental floss may be engaged to hold the same securely in position about the periphery of the holder.

7. A dental floss holder as defined in claim 6, in which said means comprises oppositely extending horn members about which the extremities of a length of dental floss may be wound.

8. A dental floss holder as defined in claim 6, in which said handle portion is formed at its opposite longitudinal edges with cutout portions of a size to fit the fingers of a hand grasping the handle for tensioning the dental floss across said space between the head and shoulder portions.

9. A dental floss holder formed of a molded bar of plastic, said holder comprising a head portion, a neck portion extending centrally from the head portion substantially in the same plane therewith, and a handle portion extending from said neck portion in a plane forming a dihedral angle with the plane of said head and neck portion, said handle portion forming shoulders extending on the respective sides of the neck portion so as to provide recesses on the respective sides of the neck portion between said shoulders and the head portion, said handle portion being formed on its opposite lateral edges, at intermediate points of the length thereof, with cut out portions of a size sufficient to accommodate the fingers of a hand grasping the handle, the edges of said head portion and the longitudinal edges of the handle portion being formed with grooves of a size and depth to accommodate a strand of dental floss about said head and handle to span said recesses and cut out portions, whereby a hand grasping the handle may tension the strand by pressing the respective portions thereof into said cut out portions, said angular plane of the head and neck portion affording a convenient position for the handle portion during use of the tensioned floss in cleaning the teeth.

References Cited in the file of this patent
UNITED STATES PATENTS

| | | |
|---|---|---|
| 1,105,005 | Sonn | July 28, 1914 |
| 2,197,345 | Meyer | Apr. 16, 1940 |

FOREIGN PATENTS

| | | |
|---|---|---|
| 19,899 | Great Britain | Sept. 11, 1902 |